United States Patent
Zhao et al.

(10) Patent No.: US 9,881,438 B2
(45) Date of Patent: Jan. 30, 2018

(54) METHOD AND SYSTEM FOR PRINTING STOCK ANTI-COUNTERFEITING BY MEANS OF FEATURE IMAGE

(71) Applicant: RUSI INFORMATION TECHNOLOGY (SHANGHAI) CO., LTD., Shanghai (CN)

(72) Inventors: Lixin Zhao, Shanghai (CN); Hongzhou Chen, Shanghai (CN); Ziming Chen, Shanghai (CN); Wei Guo, Shanghai (CN)

(73) Assignee: RUSI Information Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/032,445

(22) PCT Filed: Oct. 21, 2014

(86) PCT No.: PCT/CN2014/089046
§ 371 (c)(1),
(2) Date: Apr. 27, 2016

(87) PCT Pub. No.: WO2015/062424
PCT Pub. Date: May 7, 2015

(65) Prior Publication Data
US 2016/0275743 A1   Sep. 22, 2016

(30) Foreign Application Priority Data
Oct. 28, 2013   (CN) .......................... 2013 1 0517796

(51) Int. Cl.
*G06K 9/00* (2006.01)
*G07D 7/00* (2016.01)
*G07D 7/0047* (2016.01)

(52) U.S. Cl.
CPC ....... *G07D 7/0033* (2013.01); *G06K 9/00577* (2013.01); *G07D 7/0047* (2017.05)

(58) Field of Classification Search
CPC . G06K 9/00577; G07D 7/0047; G07D 7/0033
(Continued)

(56) References Cited

U.S. PATENT DOCUMENTS

2016/0275743 A1    9/2016  Zhao et al.

FOREIGN PATENT DOCUMENTS

| CN | 101615247 A | 12/2009 |
|----|-------------|---------|
| CN | 102126370 A | 7/2011 |

(Continued)

OTHER PUBLICATIONS

PCT Search Report, dated Jan. 14, 2016.
Chinese Patent Office Search Report, dated Oct. 28, 2013.

*Primary Examiner* — Gregory F Cunningham
(74) *Attorney, Agent, or Firm* — Dority & Manning, P.A.

(57) ABSTRACT

A method for printing stock anti-counterfeiting by using a feature image and a corresponding system is disclosed. The method comprises obtaining a feature code for identifying a printing stock by recognizing a first feature of the feature image printed on the printing stock; searching for pre-recorded first anti-counterfeiting information of the printing stock; obtaining second anti-counterfeiting information of the printing stock by recognizing a second feature of the feature image printed on the printing stock; and comparing whether a similarity between the second anti-counterfeiting information and the first anti-counterfeiting information reaches a first match threshold value to determine whether the printing stock is true or false. The first anti-counterfeiting information is embodied as a distinguishable material (Continued)

feature of the printing stock in a feature image region or features of color, shape and position of the image printed in the feature image region.

29 Claims, 2 Drawing Sheets

(58) Field of Classification Search
USPC .......................................................... 382/135
See application file for complete search history.

(56) References Cited

FOREIGN PATENT DOCUMENTS

| | | | | |
|---|---|---|---|---|
| CN | 103093361 A | * | 5/2013 | ............ G06Q 30/00 |
| CN | 103279731 A | | 9/2013 | |
| CN | 103559473 A | | 2/2014 | |
| CN | 102542660 B | * | 6/2014 | ............ G07D 7/206 |
| CN | 105023163 A | * | 11/2015 | ............ G06Q 30/00 |
| JP | 2002225415 A | | 8/2002 | |
| JP | 2003216915 A | | 7/2003 | |

* cited by examiner

METHOD AND SYSTEM FOR PRINTING STOCK ANTI-COUNTERFEITING BY MEANS OF FEATURE IMAGE

TECHNICAL FIELD

The present disclosure relates to anti-counterfeiting technology, and more particularly to a method and system for printing stock anti-counterfeiting by means of a feature image.

BACKGROUND OF THE INVENTION

Nowadays, feature information with identification function such as a two-dimension code has gained more and more applications in the commodity circulation field. However, the two-dimension code with anti-counterfeiting function is not common, and its anti-counterfeiting effect is not ideal.

For commodities into the circulation field, it is very important to find a cost-effective way of anti-counterfeiting. On one hand, it is required that the carrier with anti-counterfeiting function cannot be simply duplicated, and on the other hand, the method for testing the carrier and the method for manufacturing the carrier need to be simple and convenient, and the manufacturing and testing methods need to be low cost and easy to implement.

However, in daily life, a mobile phone has a macro photo module, which can detect the anti-counterfeiting information of the video and send it to the detection party via communication network of the mobile phone. At this time, there needs to be a carrier with identification information and not easily to be duplicated and a testing method easy to implement.

SUMMARY OF THE INVENTION

In view of the understanding of the background and the problems existing therein, it would be worth looking forward to if a easily manufactured anti-counterfeiting carrier can be provided such that it is combined with the macro mobile phone function to achieve zero cost for a customer, has non-duplicability of printing and is combined with a special two-dimension code and the back-end data platform to achieve the uniqueness function of mobile phones anti-counterfeiting.

In order to achieve the above purpose, the inventors of the present disclosure make the following research in several aspects:

Firstly, regarding the above 3 characteristics, the inventors make a lot of theoretical research and practice in two aspects of anti-counterfeiting and printing, and find out the point where the two are combined with the macro mobile phone for analysis. The general analysis process includes the following aspects: anti-counterfeiting technology, printing technology and printing related knowledge. There are a lot of anti-counterfeiting technologies such as watermark anti-counterfeiting, image feature anti-counterfeiting, a specific invisible mark, two-dimension code anti-counterfeiting, etc. The anti-counterfeiting technologies generally adopt a corresponding identification device for anti-counterfeiting identification, and the anti-counterfeiting algorithms researched more lie in the ability to resist printing error and the ability to resist damage. Due to the particularity of its identification device, it cannot be combined with the macro mobile phone function. At the beginning, our goal aims at the non-repeatability of printing. There must be errors in printing, and they may be errors in image shape (which is related to printing accuracy) or errors in color (which is related to many factors). 1) errors in shape. By analyzing design accuracy of the macro module, the minimum point of the object for us to recognize and print has a theoretical diameter value of about 7 um~10 um. However, the highest print resolution of Epson now is 5760*1440 dpi, and the diameter of the minimum point for printing can reach 5 um; when looking at the actual printed image, its resolution will exceed the macro module. 2) errors in color. By consulting and analyzing all kinds of printing samples in a printing shop, it can be obviously seen that the same color patterns have difference in color for different batches of prints, and that regarding the same print document, using different machines for printing, different paper for printing and different surface sizing agents will all cause color difference. Thus, the color analysis of the printing acts as the analysis direction of the non-repeatability.

Image half-toning: a digital image of the printing must be converted to an image having the same depth as that of the output device before output. Image half-toning generally needs to be used, and it is a technology that functions to convert an image with a higher depth into an image with a lower depth and to make the two as similar as possible visually.

Image depth: number of binary data bits for a digital image to represent its image color. For example, an image with a depth of 8 can represent 256 different color values or gray values.

The minimum depth that a human eye can distinguish is 1.73.

Through the image half-toning technology, it is possible to output an image with a higher depth on an output device (a printer) with a lower depth so as to obtain a printing effect with a higher quality. Furthermore, the development of the error diffusion halftone technology enables the inkjet printing to obtain a photorealistic color effect.

Modulation and Screening:

Taking a continuous tone image as an input signal and a halftone image as an output signal, then the method that a half-toning algorithm uses binary pixels to represent a certain grey value or color value of a continuous tone image can be interpreted as a signal modulation method. It can be divided into amplitude modulation, frequency modulation and hybrid modulation.

Half-toning an image by using a point process algorithm is also called as screening.

Amplitude modulation half-toning: a half-toned image is divided into square units of equal equal size, i.e. network point units. In the network point units, the collection of pixel points with the value of 1 is called as network points, and a proportion value of the network point area to the network point unit area represents an average gray value of pixel points in a corresponding network point unit region, which is also called as a network point percentage value or a network point value for short when using a percentage to represent it. The arrangement direction of network point units is called as a network angle. In the arrangement direction of network points, the number of network point units within a unit length scope is called as a screening frequency (in unit of lpi (lines per inch)). Modulation method of amplitude modulation: on the condition that the screening frequency keeps unchanged, the size of the network point unit is also unchanged, and the color or gray value of the image is expressed by changing the area of the network point. The area of the network point is just the amplitude of the amplitude modulation.

When the pixel accuracy is determined, there is a compromise between the detail resolution and the maximum gray level of the image. Frequency modulation: the color or gray value of the image is expressed by a frequency in which a pixel point with a value of 1 appears in a unit area region. Furthermore, the combination of the amplitude modulation and frequency modulation is just hybrid half-toning.

The screening frequency of amplitude modulation can only reach 175 lpi and can reach 300 lpi after combination, while maintaining basically the same gray level expressiveness.

It can thus be seen that for printing of an image, the minimum accuracy of its pixel points is unable to accurately complete the gray value or color value, and it can reflect a comprehensive expressiveness of the final resolution and color revivification degree of the printing after a specific screening modulation.

Color Printing Process:

The color displayed by a computer is a RGB mode of red, green and blue, while it can be printed only when the RGB mode is converted into a CMYK mode of cyan, magenta, yellow and black. Furthermore, the three colors of C, M and Y are formed by combinations of three primary colors of RGB that a naked eye cannot identify, and then black is added to make the dark part of the image performed better. For software, firstly all RGB data need to be collected for conversion, and the RGB data are converted to a corresponding three-dimensional spreadsheet, wherein each RGB data channel corresponds to a corresponding grid to thereby obtain CMYK data. After collecting the CMYK data, a machine employs advanced technology to determine storage locations of four ink droplets of cyan, magenta, yellow and black, under the control of the fine image halftone adjusting technology. However, it should note that not all CMYK data is stored in a piece of pixel information and only the color information exceeding a predetermined value can be included in the ink droplet information. In order to get a perfect printing quality, it is also necessary to reprocess those data that cannot be converted into ink droplet information, i.e., combining it with the remaining image information and relocate it with an error diffusion mode.

Through the above analysis, the inventors of the present disclosure comes to the following basic conclusions:

Although printing of color can have a good adaptability to a human eye by employing a fine technical control such as an error diffusion method, in microscopic view, at the pixel point level, its color cannot be revivified accurately, and it can only reflect a comprehensive expressiveness of the final resolution and color revivification degree of the printing after a specific screening modulation.

In this regard, the highest resolution 5760*1440 dpi (achieve 5 um) of Epson printing for example corresponds to the minimum and finest ink droplet. For example, the minimum ink droplet of Epson can be 1.5 picoliter, and in order to improve the printing speed, its ink droplets may have 3 sizes, i.e. except the finest small ink droplets, there are also medium ink droplets and big ink droplets whose sizes are respectively 3 times and 5 times of the small ink droplets. However, a complex color needs the ratio of different proportions of CMYK, and its size is much greater than the size of the space corresponding to the printing accuracy, and thus the complex color of a 10~20 um sized space does not have the duplicability of printing.

In conclusion, if using mixed ink to form a complex color in a single point with its ratio constantly changing, that is, when the inks are mixed, keep adding a certain kind of ink to constantly change its color, can achieve non-duplicability of printing, and then will form uniqueness together with the sequence feature of a certain kind of two-dimension code.

Based on the above understanding, the inventors of the present disclosure through analysis provides a first aspect of the present disclosure that provides a method for printing stock anti-counterfeiting by means of a feature image, characterized in comprising steps of:

obtaining a feature code for identifying a printing stock by recognizing a first feature of the feature image printed on the printing stock, and correspondingly searching for pre-recorded first anti-counterfeiting information of the printing stock in a database by using the feature code;

obtaining second anti-counterfeiting information of the printing stock by recognizing a second feature of the feature image printed on the printing stock; and comparing whether a similarity between the second anti-counterfeiting information and the first anti-counterfeiting information reaches a first match threshold value through a manual comparing method or an intelligent device comparing method, wherein if the similarity is higher than the first match threshold value, the printing stock is true, else if the similarity is lower than the first match threshold value, the printing stock is false, wherein the first anti-counterfeiting information is embodied as a distinguishable material feature of the printing stock in a feature image region or features of color, shape and position of an image printed in the feature image region.

In one embodiment according to the present disclosure, the feature code is a unique identifier corresponding to each printing stock.

In one embodiment according to the present disclosure, the second feature is the distinguishable material feature of the printing stock in the feature image region or the features of color, shape and position of the image printed in the feature image region.

In one embodiment according to the present disclosure, the features of color, shape and position of the feature image are embodied as position, shape and color features of a single print point or multiple print points in a whole or local region of the feature image.

In one embodiment according to the present disclosure, the color feature of the single print point or multiple print points is produced by randomly mixing different colors of electronic ink, ink or toner of a printing device such that a proportion of the non-monochromatic mixed electronic ink, ink or toner changes randomly.

In one embodiment according to the present disclosure, the color feature of the multiple print points is generated by, during a process of forming the feature image, further adding at least one color of electronic ink, ink or toner for mixing so that proportions of different colors of electronic ink, ink or toner in each print point of the multiple print points respectively randomly change over time, thereby causing the color feature of each print point in the multiple print points to have difference.

In one embodiment according to the present disclosure, the position feature of the single print point is that the single print point is positioned in a specific position in the feature image.

In one embodiment according to the present disclosure, the position feature of the multiple print points is an arrangement, layout and correlation between the multiple print points.

In one embodiment according to the present disclosure, regarding the single print point or multiple print points, an irregular random geometric figure of a print point formed by printing due to performance of a printing device or an overall figure formed by some of the geometric figures reflects the shape feature of the single print point or multiple print points.

In one embodiment according to the present disclosure, the first feature is obtained by collecting a low frequency component of the feature image, and the first feature is captured by an optical device using a normal focal length. It should be understood by those skilled in the art that the low frequency component herein refers to the specific description of the printing accuracy being within 300 dpi.

In one embodiment according to the present disclosure, the second feature is obtained by collecting a high frequency component of the feature image, and the second feature is captured by an optical device using a microspur or normal focal length plus a magnifying auxiliary device. It should be understood by those skilled in the art that the high frequency component herein refers to the specific description of the printing accuracy being higher than 300 dpi.

In one embodiment according to the present disclosure, the distinguishable material feature includes a metal line with a random shape in a random region in a feature region.

In one embodiment according to the present disclosure, the distinguishable material feature includes different random colors in different regions of the feature image caused by spraying non-monochromatic mixed electronic ink, ink or toner to the printing stock.

In one embodiment according to the present disclosure, the features of color, shape and position of the image are randomly changed color of the non-monochromatic mixed electronic ink, ink or toner caused by randomly mixing different colors of electronic ink, ink or toner by a printing device.

In one embodiment according to the present disclosure, the features of color, shape and position of the image are randomly changed proportions of different colors of electronic ink, ink or toner in the non-monochromatic mixed electronic ink, ink or toner in the image image caused by further adding, during a process of forming the feature image, at least one color of electronic ink, ink or toner.

In one embodiment according to the present disclosure, the pre-recorded first anti-counterfeiting information of the feature image is obtained by pre-configuring initial anti-counterfeiting information of the feature image by an optical device and correspondingly recording it to the database to form the first anti-counterfeiting information.

In one embodiment according to the present disclosure, the second anti-counterfeiting information is a subset of the first anti-counterfeiting information.

In addition, the second aspect of the present disclosure further provides a system for printing stock anti-counterfeiting by means of a feature image, characterized in that the system comprises a feature image processing module and a database, wherein the feature image processing module, at the first time, processes and recognizes a first feature of the feature image printed on a printing stock to obtain a feature code for identifying the printing stock; the feature image processing module processes and recognizes a second feature of the feature image printed on the printing stock and pre-records corresponding first anti-counterfeiting information in the database; the feature image processing module, at the second time, processes and recognizes the first feature of the feature image printed on the printing stock to obtain the feature code for identifying the printing stock and correspondingly searches for the pre-recorded first anti-counterfeiting information of the printing stock in the database by using the feature code, and recognizes the second feature of the feature image printed on the printing stock to obtain the second anti-counterfeiting information of the printing stock, the second anti-counterfeiting information being a subset of the first anti-counterfeiting information;

the database compares whether a similarity between the second anti-counterfeiting information and the first anti-counterfeiting information reaches a first match threshold value through a manual comparing method or an intelligent device comparing method, wherein if the similarity is higher than the first match threshold value, the printing stock is true, else if the similarity is lower than the first match threshold value, the printing stock is is false, and wherein the first anti-counterfeiting information or the second anti-counterfeiting information is embodied as a distinguishable material feature of the printing stock in a feature image region or features of color, shape and position of an image printed in the feature image region.

In one embodiment according to the present disclosure, the system further comprises a feature image collecting module configured to collect the feature image by an optical device.

In one embodiment according to the present disclosure, the system further comprises a data communication module, through which information including whether the printing stock is true or false is transmitted to and displayed in the client.

In one embodiment according to the present disclosure, the feature code is a unique identifier corresponding to each printing stock.

In one embodiment according to the present disclosure, the second feature is the distinguishable material feature in the feature image region or the features of position, shape and color of the single print point or multiple print points in a whole or local region of the feature image.

In one embodiment according to the present disclosure, the first feature is obtained by collecting a low frequency component of the feature image, and the first feature is captured by an optical device using a normal focal length. It should be understood by those skilled in the art that the low frequency component herein refers to the specific description of the printing accuracy being within 300 dpi.

In one embodiment according to the present disclosure, the second feature is obtained by collecting a high frequency component of the feature image, and the second feature is captured by an optical device using a microspur or normal focal length plus a magnifying auxiliary device. It should be understood by those skilled in the art that the high frequency component herein refers to the specific description of the printing accuracy being higher than 300 dpi.

In one embodiment according to the present disclosure, the distinguishable material feature includes a metal line with a random shape in a random region in the feature region.

In one embodiment according to the present disclosure, the distinguishable material feature includes different random colors in different regions of the feature image caused by spraying non-monochromatic mixed electronic ink, ink or toner to the printing stock.

In one embodiment according to the present disclosure, the features of color, shape and position of the image are randomly changed color of the non-monochromatic mixed electronic ink, ink or toner caused by randomly mixing different colors of electronic ink, ink or toner by a printing device.

In one embodiment according to the present disclosure, the features of color, shape and position of the image are randomly changed proportions of different colors of electronic ink, ink or toner in the non-monochromatic mixed electronic ink, ink or toner in the image caused by further adding, during a process of forming the feature image, at least one color of electronic ink, ink or toner for mixing.

In one embodiment according to the present disclosure, the pre-recorded first anti-counterfeiting information of the feature image is obtained by pre-configuring initial anti-counterfeiting information of the feature image by an optical device and correspondingly recording it to the database to form the first anti-counterfeiting information.

The above and other features of the present disclosure will be clearly illustrated in the example sections below.

BRIEF DESCRIPTION OF THE DRAWINGS

The features, objects and advantages of the present disclosure can be understood more easily by reading the following detailed description of nonrestrictive embodiments making references to the accompanying drawings, in which the same or similar reference signs represent the same or similar means.

In the figures, the same or corresponding reference signs represent the same or corresponding parts.

DESCRIPTION OF PREFERRED EMBODIMENTS

Figure 1:
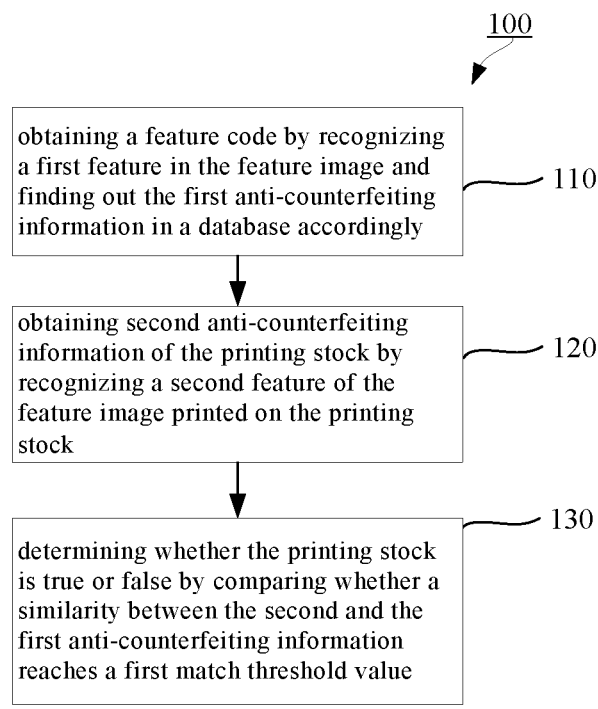
FIG. 1 illustrates a flowchart of a method 100 for printing stock anti-counterfeiting by means of a feature image according to the present disclosure.

The implementation and use of embodiments are discussed in detail below. However, it should be understood that the specific embodiments discussed below only exemplarily illustrate the specific manner of implementing and using the present disclosure, rather than limiting the scope of the present disclosure.

In order to describe the present disclosure clearly, definitions are made in the following three points.

Firstly, the feature image in this document is a two-dimension code or a one-dimension code, and the two-dimension code can be, but not limited to, a 2D bar code and a high density 2D symbol. Herein the high density 2D symbol is taken as an example, and it is generally in a rectangle shape arranged by n*n symbol elements. There are direction identifying elements on the borders of two mutually perpendicular sides, and it reflects specific information by indicating a binary "1" in places with dots in corresponding pixel positions of the matrix and indicating a binary "0" in places without dots. Its size generally is 21*21 to 177*177 lattices where each lattice is called as a 1*1 dot matrix, and thus the size of the two-dimension code is not completely defined.

Secondly, the focus of this document lies in configuring a feature anti-counterfeiting region (the anti-counterfeiting region may be 1 mm*1 mm) in all regions or specific regions in the feature image (i.e. the two-dimension code), but the feature anti-counterfeiting region may not be necessarily recognized by a naked eye. The feature anti-counterfeiting region may be configured with a certain number of points such as 1, 100, 1000 or 10000 points. These points are generally circular or oval, and these points have some corresponding feature value data such as shape, position, color, and correlation between points. In practice, since the printing accuracy is 5 microns while the accuracy of the camera module resolution of a mobile phone now cannot reach so high and it is lower than 5 microns, a mixed color (mixing inks when dotting) or position is employed as the feature value data. However, it can also be seen that with the development of science and technology, the accuracy of the resolution of the camera module will be higher than 5 microns in the future, and thus anti-counterfeiting recognition can be done via shape, position and/or color of a single point or multiple points. Before the anti-counterfeiting recognition, anti-counterfeiting authentication data for all points in the feature anti-counterfeiting region of each two-dimension code will be preconfigured correspondingly in a database module on the server-side, and the feature value data is a subset of of the anti-counterfeiting authentication data. For example, there are 10000 points in the feature anti-counterfeiting region of a two-dimension code A and the feature value data is in fact for 100 100 points, but the anti-counterfeiting authentication data in the database module corresponds to 10000 points, while in the actual retrieval matching, taking a subset from the 100 points, which is an algorithm mechanism at the back-end, and a threshold such as 80% or 90% may be set corresponding to success or failure of the match.

The present disclosure provides a method 100 for printing stock anti-counterfeiting by means of a feature image, and as seen from FIG. 1, the method mainly comprises three steps as below.

Firstly, in the first step 110, a feature code for identifying a printing stock is obtained by recognizing a first feature of the feature image printed on the printing stock, and pre-recorded first anti-counterfeiting information of the printing stock in a database is searched correspondingly by using the feature code.

Then, in the following second step 120, second anti-counterfeiting information of the printing stock is obtained by recognizing a second feature of the feature image printed on the printing stock.

Finally, after obtaining the aforesaid first anti-counterfeiting information and second anti-counterfeiting information, in step 130, it is compared whether a similarity between the second anti-counterfeiting information and the first anti-counterfeiting information reaches a first match threshold value through a manual comparing method or an intelligent device comparing method. If the similarity is higher than the first match threshold value, the printing stock is true. If the similarity is lower than the first match threshold value, the printing stock is false. Herein the first anti-counterfeiting information is embodied as a distinguishable material feature of the printing stock in a feature image region or features of color, shape and position of an image printed in the feature image region.

In one embodiment according to the present disclosure, the feature code is a unique identifier corresponding to each printing stock, that is, one piece, one code or one object, one code. In this way, the uniquely corresponding first anti-counterfeiting information can be found in the corresponding database to thereby provide a powerful data guarantee for the subsequent comparison.

In one embodiment according to the present disclosure, the second feature is the distinguishable material feature of the printing stock in the feature image region or the features of color, shape and position of the image printed in the feature image region. In this way, desired information can be identified in the feature image region.

In one embodiment according to the present disclosure, the features of color, shape and position of the feature image are embodied as position, shape and color features of a single print point or multiple print points in a whole or local region of the feature image. Herein, the position, shape and color features of the points in the whole or local region of a specific image are highlighted.

In one embodiment according to the present disclosure, the color feature of the single print point or multiple print points is produced by randomly mixing different colors of electronic ink, ink or toner by a printing device such that a proportion of the non-monochromatic mixed electronic ink, ink or toner changes randomly.

In one embodiment according to the present disclosure, the color feature of the multiple print points is generated by, during a process of forming the feature image, further adding at least one color of electronic ink, ink or toner for mixing so that proportions of different colors of electronic ink, ink or toner in each print point of the multiple print points respectively randomly change over time, thereby causing the color feature of each print point in the multiple print points to have difference.

In one embodiment according to the present disclosure, the position feature of the single print point is that the single print point is positioned in a specific position in the feature image.

In one embodiment according to the present disclosure, the position feature of the multiple print points is that an arrangement, layout of the multiple print points and correlation between each of the multiple print points.

In one embodiment according to the present disclosure, regarding the single print point or multiple print points, an irregular random geometric figure of a print point formed by printing due to performance of the printing device or an overall figure formed by some of such geometric figures reflects the shape feature of the single print point or multiple print points.

In one embodiment according to the present disclosure, the first feature is obtained by collecting a low frequency component of the feature image, and the first feature is captured by an optical device using a normal focal length.

In one embodiment according to the present disclosure, the second feature is obtained by collecting a high frequency component of the feature image, and the second feature is captured by an optical device using a microspur or normal focal length plus a magnifying auxiliary device.

In one embodiment according to the present disclosure, the distinguishable material feature includes a metal line with a random shape in a random region in the feature region.

In one embodiment according to the present disclosure, the distinguishable material feature includes different random colors in different regions of the feature image caused by spraying non-monochromatic mixed electronic ink, ink or toner to the printing stock.

In one embodiment according to the present disclosure, the features of color, shape and position of the image are randomly changed color of the non-monochromatic mixed electronic ink, ink or toner caused by randomly mixing different colors of electronic ink, ink or toner by a printing device.

In one embodiment according to the present disclosure, the features of color, shape and position of the image are randomly changed proportions of different colors of electronic ink, ink or toner in the non-monochromatic mixed electronic ink, ink or toner in the image caused by further adding, during a process of forming the feature image, at least one color of electronic ink, ink or toner to the image on the whole for mixing.

In one embodiment according to the present disclosure, the pre-recorded first anti-counterfeiting information of the feature image is obtained by pre-configuring initial anti-counterfeiting information of the feature image by an optical device and correspondingly recording it to the database to form the first anti-counterfeiting information.

In one embodiment according to the present disclosure, the second anti-counterfeiting information is a subset of the first anti-counterfeiting information.

Figure 2:
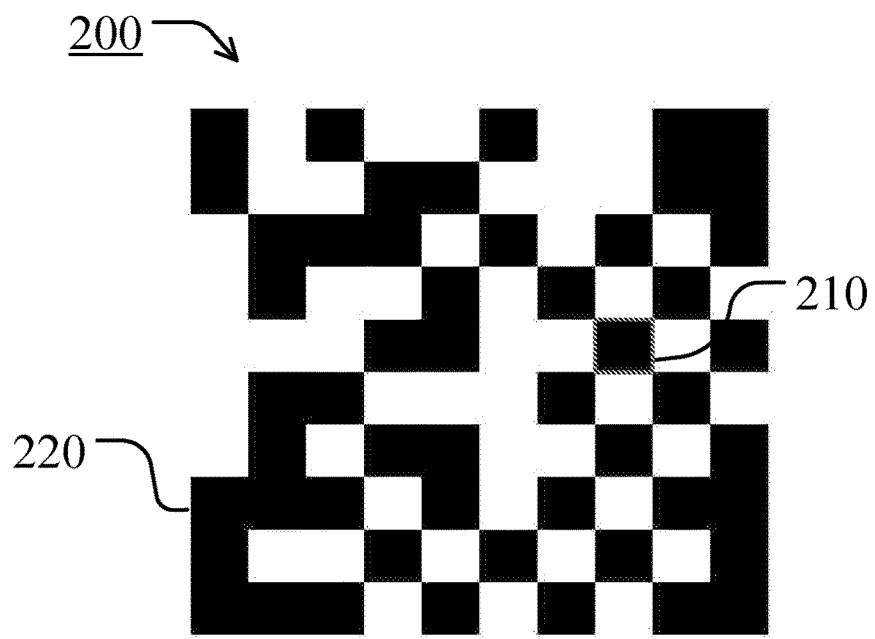
FIG. 2 illustrates a schematic diagram of an embodiment 200 of a printing stock according to the present disclosure.
Figure 3:
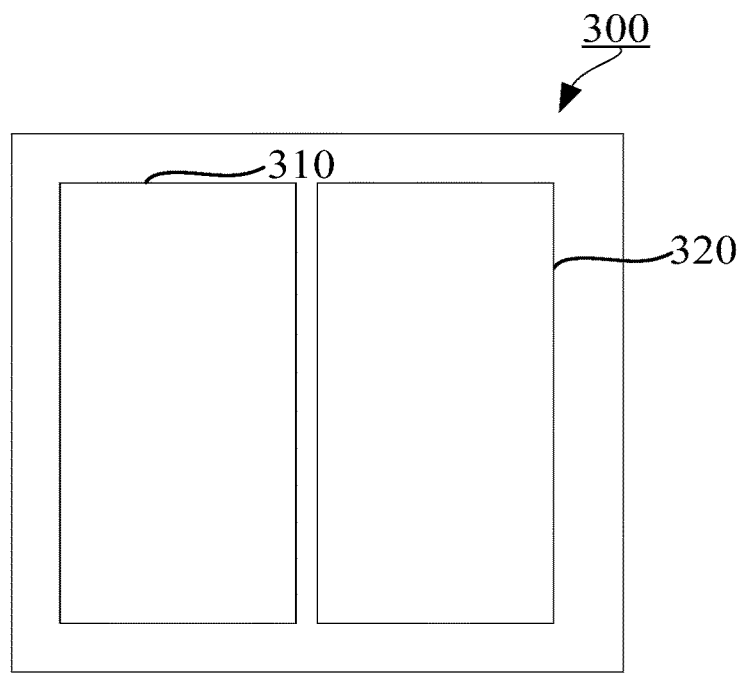
FIG. 3 illustrates a schematic diagram of a system 300 for printing stock anti-counterfeiting by means of a feature image according to the present disclosure.

It is introduced above how to achieve printing stock anti-counterfeiting by means of a feature image, and next a schematic diagram of a printing stock with a feature image will be described by means of FIG. 2. It can be seen from FIG. 2 that the printing stock comprises a two-dimension code and a feature image is comprised in at least part of the regions in the two-dimension code. Generally speaking, the feature region exists in the two-dimension code. However, it should be understood by those skilled in the art that the position relation between the feature region 310 and the two-dimension code region 320 therein is only schematic rather than restrictive in FIG. 2. That is to say, the feature region 310 may be outside the feature image recognition region 320, on its border or in any region within it. Furthermore, the printing stock shown herein is a two-dimension code, which is only exemplary rather than restrictive, and all printing stocks capable of achieving the object of the present disclosure fall into the protection scope of the present disclosure.

Corresponding to the aforesaid anti-counterfeiting recognition system, the second aspect of the present disclosure further provides a system 300 for printing stock anti-counterfeiting by means of a feature image, and the system comprises a feature image processing module 310 and a database 320.

The feature image processing module 310, at the first time, processes and recognizes a first feature of the feature image printed on a printing stock to obtain a feature code for identifying the printing stock. The feature image processing module 310 processes and recognizes a second feature of the feature image printed on the printing stock and pre-records corresponding first anti-counterfeiting information in a database. The feature image processing module 310, at the second time, processes and recognizes a first feature of the feature image printed on the printing stock to obtain the feature code for identifying the printing stock and correspondingly searches for the pre-recorded first anti-counterfeiting information of the printing stock in the database by using the feature code, and recognizes the second feature of the feature image printed on the printing stock to obtain second anti-counterfeiting information of the printing stock. The second anti-counterfeiting information is a subset of the first anti-counterfeiting information;

The database 320 compares whether a similarity between the second anti-counterfeiting information and the first anti-counterfeiting information reaches a first match threshold value through a manual comparing method or an intelligent device comparing method. If the similarity is higher than the first match threshold value, the printing stock is true, else if the similarity is lower than the first match threshold value, the printing stock is false.

Herein, the first anti-counterfeiting information or second anti-counterfeiting information is embodied as a distinguishable material feature of the printing stock in a feature image region or features of color, shape and position of an image printed in the feature image region.

In one embodiment according to the present disclosure, the system further comprises a feature image collecting module configured to collect the feature image by an optical device.

In one embodiment according to the present disclosure, the system further comprises a data communication module, through which information including whether the printing stock is true or false is transmitted to and displayed in the client.

In one embodiment according to the present disclosure, the feature code is a unique identifier corresponding to each printing stock.

In one embodiment according to the present disclosure, the second feature is the distinguishable material feature in the feature image region or the features of position, shape and color of the single print point or multiple print points in a whole or local region of the feature image.

In one embodiment according to the present disclosure, the first feature is obtained by collecting a low frequency component of the feature image, and the first feature is captured by an optical device using a normal focal length.

In one embodiment according to the present disclosure, the second feature is obtained by collecting a high frequency component of the feature image, and the second feature is captured by an optical device using a microspur or normal focal length plus a magnifying auxiliary device.

In one embodiment according to the present disclosure, the distinguishable material feature includes a metal line with a random shape in a random region in the feature region.

In one embodiment according to the present disclosure, the distinguishable material feature includes different random colors in different regions of the feature image caused by spraying non-monochromatic mixed electronic ink, ink or toner to the printing stock.

In one embodiment according to the present disclosure, the features of color, shape and position of the image are randomly changed color of the non-monochromatic mixed electronic ink, ink or toner on the image as a whole caused by randomly mixing different colors of electronic ink, ink or toner by a printing device.

In one embodiment according to the present disclosure, the features of color, shape and position of the image are randomly changed proportions of different colors of electronic ink, ink or toner in the non-monochromatic mixed electronic ink, ink or toner in the image caused by further adding, during a process of forming the feature image, at least one color of electronic ink, ink or toner for mixing.

In one embodiment according to the present disclosure, the pre-recorded first anti-counterfeiting information of the feature image is obtained by pre-configuring initial anti-counterfeiting information of the feature image by an optical device and correspondingly recording it to the database to form the first anti-counterfeiting information.

Although the present disclosure has been described by making references to some specific embodiments, it should be understood that the present disclosure is not limited to the specific embodiments disclosed. The present disclosure aims to cover various modifications and equivalent arrangements included within the spirit and scope of the appended claims. The scope of the appended claims is in line with the broadest interpretation, and thereby includes all of such modifications and equivalent structures and functions.

The invention claimed is:

1. A method for printing stock anti-counterfeiting by means of a feature image, characterized in comprising steps of:
   obtaining a feature code for identifying a printing stock by recognizing a first feature of the feature image printed on the printing stock, and correspondingly searching for pre-recorded first anti-counterfeiting information of the printing stock in a database by using the feature code;
   obtaining second anti-counterfeiting information of the printing stock by recognizing a second feature of the feature image printed on the printing stock; and
   comparing whether a similarity between the second anti-counterfeiting information and the first anti-counterfeiting information reaches a first match threshold value through a manual comparing method or an intelligent device comparing method, wherein if the similarity is higher than the first match threshold value, the printing stock is true, else if the similarity is lower than the first match threshold value, the printing stock is false,
   wherein the first anti-counterfeiting information is embodied as a distinguishable material feature of the printing stock in a feature image region or features of color, shape and position of an image printed in the feature image region.

2. The method for printing stock anti-counterfeiting by means of a feature image according to claim 1, characterized in that the feature code is a unique identifier corresponding to each printing stock.

3. The method for printing stock anti-counterfeiting by means of a feature image according to claim 1, characterized in that the second feature is the distinguishable material feature of the printing stock in the feature image region or the features of color, shape and position of the image printed in the feature image region.

4. The method for printing stock anti-counterfeiting by means of a feature image according to claim 1, characterized in that the features of color, shape and position of the image are embodied as position, shape and color features of a single print point or multiple print points in a whole or local region of the feature image.

5. The method for printing stock anti-counterfeiting by means of a feature image according to claim 4, characterized in that the color feature of the single print point or multiple print points is produced by randomly mixing different colors of electronic ink, ink or toner of a printing device such that a proportion of the non-monochromatic mixed electronic ink, ink or toner changes randomly.

6. The method for printing stock anti-counterfeiting by means of a feature image according to claim 4, characterized in that the color feature of the multiple print points is generated by, during a process of forming the feature image, further adding at least one color of electronic ink, ink or toner for mixing so that proportions of different colors of electronic ink, ink or toner in each print point of the multiple print points respectively randomly change over time, thereby causing the color feature of each print point in the multiple print points to have difference.

7. The method for printing stock anti-counterfeiting by means of a feature image according to claim 4, characterized in that the position feature of the single print point is that the single print point is positioned in a specific position in the feature image.

8. The method for printing stock anti-counterfeiting by means of a feature image according to claim 4, characterized in that the position feature of the multiple print points is an arrangement, layout and correlation between the multiple print points.

9. The method for printing stock anti-counterfeiting by means of a feature image according to claim 4, characterized in that regarding the single print point or multiple print points, an irregular random geometric figure of a print point formed by printing due to performance of a printing device or an overall figure formed by some of the geometric figures reflects the shape feature of the single print point or multiple print points.

10. The method for printing stock anti-counterfeiting by means of a feature image according to claim 1, characterized in that the first feature is obtained by collecting a low frequency component of the feature image, and the first feature is captured by an optical device using a normal focal length.

11. The method for printing stock anti-counterfeiting by means of a feature image according to claim 1, characterized in that the second feature is obtained by collecting a high frequency component of the feature image, and the second feature is captured by an optical device using a microspur or normal focal length plus a magnifying auxiliary device.

12. The method for printing stock anti-counterfeiting by means of a feature image according to claim 1, characterized in that the distinguishable material feature includes a metal line with a random shape in a random region in a feature region.

13. The method for printing stock anti-counterfeiting by means of a feature image according to claim 1, characterized in that the distinguishable material feature includes different random colors in different regions of the feature image caused by spraying non-monochromatic mixed electronic ink, ink or toner to the printing stock.

14. The method for printing stock anti-counterfeiting by means of a feature image according to claim 1, characterized in that the features of color, shape and position of the image are randomly changed color of the non-monochromatic mixed electronic ink, ink or toner caused by randomly mixing different colors of electronic ink, ink or toner by a printing device.

15. The method for printing stock anti-counterfeiting by means of a feature image according to claim 1, characterized in that the features of color, shape and position of the image are randomly changed proportions of different colors of electronic ink, ink or toner in the non-monochromatic mixed electronic ink, ink or toner in the image caused by further adding, during a process of forming the feature image, at least one color of electronic ink, ink or toner for mixing.

16. The method for printing stock anti-counterfeiting by means of a feature image according to claim 1, characterized in that the pre-recorded first anti-counterfeiting information of the feature image is obtained by pre-configuring initial anti-counterfeiting information of the feature image by an optical device and correspondingly recording it to the database to form the first anti-counterfeiting information.

17. The method for printing stock anti-counterfeiting by means of a feature image according to claim 1, characterized in that the second anti-counterfeiting information is a subset of the first anti-counterfeiting information.

18. A system for printing stock anti-counterfeiting by means of a feature image, characterized in that the system comprises a feature image processing module and a database, wherein the feature image processing module, at the first time, processes and recognizes a first feature of the feature image printed on a printing stock to obtain a feature code for identifying the printing stock; the feature image processing module processes and recognizes a second feature of the feature image printed on the printing stock and pre-records corresponding first anti-counterfeiting information in the database; the feature image processing module, at the second time, processes and recognizes the first feature of the feature image printed on the printing stock to obtain the feature code for identifying the the printing stock and correspondingly searches for the pre-recorded first anti-counterfeiting information of the printing stock in the database by using the feature code, and recognizes the second feature of the feature image printed on the printing stock to obtain the second anti-counterfeiting information of the printing stock, the second anti-counterfeiting information being a subset of the first anti-counterfeiting information;

the database compares whether a similarity between the second anti-counterfeiting information and the first anti-counterfeiting information reaches a first match threshold value through a manual comparing method or an intelligent device comparing method, wherein if the similarity is higher than the first match threshold value, the printing stock is true, else if the similarity is lower than the first match threshold value, the printing stock is false, and wherein the first anti-counterfeiting information or the second anti-counterfeiting information is embodied as a distinguishable material feature of the printing stock in a feature image region or features of color, shape and position of an image printed in the feature image region.

19. The system for printing stock anti-counterfeiting by means of a feature image according to claim 18, characterized in that the system further comprises:
a feature image collecting module configured to collect the feature image by an optical device.

20. The system for printing stock anti-counterfeiting by means of a feature image according to claim 18, characterized in that the system further comprises:
a data communication module, through which information including whether the printing stock is true or false is transmitted to and displayed in the client.

21. The system for printing stock anti-counterfeiting by means of a feature image according to claim 18, characterized in that the feature code is a unique identifier corresponding to each printing stock.

22. The system for printing stock anti-counterfeiting by means of a feature image according to claim 18, characterized in that the second feature is the distinguishable material feature in the feature image region or the features of position, shape and color of the single print point or multiple print points in a whole or local region of the feature image.

23. The system for printing stock anti-counterfeiting by means of a feature image according to claim 18, characterized in that the first feature is obtained by collecting a low frequency component of the feature image, and the first feature is captured by an optical device using a normal focal length.

24. The system for printing stock anti-counterfeiting by means of a feature image according to claim 18, characterized in that the second feature is obtained by collecting a high frequency component of the feature image, and the second feature is captured by an optical device using a microspur or normal focal length plus a magnifying auxiliary device.

25. The system for printing stock anti-counterfeiting by means of a feature image according to claim 18, characterized in that the distinguishable material feature includes a metal line with a random shape in a random region in the feature region.

26. The system for printing stock anti-counterfeiting by means of a feature image according to claim 18, characterized in that the distinguishable material feature includes different random colors in different regions of the feature image caused by spraying non-monochromatic mixed electronic ink, ink or toner to the printing stock.

27. The system for printing stock anti-counterfeiting by means of a feature image according to claim 18, characterized in that the features of color, shape and position of the image are randomly changed color of the non-monochromatic mixed electronic ink, ink or toner caused by randomly mixing different colors of electronic ink, ink or toner by a printing device.

28. The system for printing stock anti-counterfeiting by means of a feature image according to claim 18, characterized in that the features of color, shape and position of the image are randomly changed proportions of different colors of electronic ink, ink or toner in the non-monochromatic mixed electronic ink, ink or toner in the image caused by further adding, during a process of forming the feature image, at least one color of electronic ink, ink or toner for mixing.

29. The system for printing stock anti-counterfeiting by means of a feature image according to claim 18, characterized in that the pre-recorded first anti-counterfeiting information of the feature image is obtained by pre-configuring initial anti-counterfeiting information of the feature image by an optical device and correspondingly recording it to the database to form the first anti-counterfeiting information.

* * * * *